United States Patent
Kwon

(10) Patent No.: US 10,221,920 B2
(45) Date of Patent: Mar. 5, 2019

(54) AUTOMOBILE REDUCER

(71) Applicant: MANDO CORPORATION, Pyeongtaek-si, Gyeonggi-do (KR)

(72) Inventor: Hyun Bi Kwon, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/988,686

(22) Filed: Jan. 5, 2016

(65) Prior Publication Data

US 2016/0201761 A1    Jul. 14, 2016

(30) Foreign Application Priority Data

Jan. 12, 2015    (KR) ........................ 10-2015-0004013

(51) Int. Cl.
| | |
|---|---|
| *F16H 1/16* | (2006.01) |
| *F16C 35/063* | (2006.01) |
| *F16C 27/06* | (2006.01) |
| *F16H 57/021* | (2012.01) |
| *F16C 19/06* | (2006.01) |

(52) U.S. Cl.
CPC ............ *F16H 1/16* (2013.01); *F16C 27/066* (2013.01); *F16C 35/063* (2013.01); *F16C 19/06* (2013.01); *F16C 2361/61* (2013.01); *F16C 2380/27* (2013.01); *F16H 1/163* (2013.01); *F16H 2057/0213* (2013.01)

(58) Field of Classification Search
CPC .................................. F16H 1/16; F16H 1/163
See application file for complete search history.

(56) References Cited

U.S. PATENT DOCUMENTS

| | | | |
|---|---|---|---|
| 5,572,906 A | * | 11/1996 | Jorg ........................ F16H 1/16 |
| | | | 403/331 |
| 7,490,695 B2 | | 2/2009 | Segawa |
| 7,591,341 B2 | * | 9/2009 | Shimamoto .......... B62D 5/0409 |
| | | | 180/444 |

(Continued)

FOREIGN PATENT DOCUMENTS

| | | |
|---|---|---|
| CN | 102530057 A | 7/2012 |
| CN | 102858618 A | 1/2013 |

(Continued)

OTHER PUBLICATIONS

Chinese Office Action dated Aug. 23, 2017 in connection with the counterpart Chinese Patent Application No. 201610017232.7.

*Primary Examiner* — William Kelleher
*Assistant Examiner* — Gregory T Prather
(74) *Attorney, Agent, or Firm* — Hauptman Ham, LLP

(57) ABSTRACT

The present disclosure provides an automobile reducer including a worm shaft bearing including an inner race coupled to an end of a worm shaft, which meshes with a worm wheel, an outer race coupled to an inner surface of a gear housing, and a ball coupled between the inner race and the outer race; a motor boss having a coupling hole formed on one side, a motor shaft of a motor being inserted into the coupling hole, and an insertion hole formed on the other side, the worm shaft being inserted into the insertion hole; and a damping member coupled between a side surface of the inner race and a side surface of the motor boss and elastically supported in an axial direction.

9 Claims, 5 Drawing Sheets

(56) References Cited

U.S. PATENT DOCUMENTS

| | | | | |
|---|---|---|---|---|
| 8,667,858 B2* | 3/2014 | Fuechsel | ............... | B62D 5/0409 |
| | | | | 384/535 |
| 2003/0146039 A1* | 8/2003 | Sano | .................... | B62D 5/0409 |
| | | | | 180/444 |
| 2006/0191736 A1* | 8/2006 | Maeda | ................. | B62D 5/0409 |
| | | | | 180/444 |
| 2007/0102228 A1* | 5/2007 | Shiina | .................. | B62D 5/0409 |
| | | | | 180/444 |
| 2008/0156132 A1* | 7/2008 | Pachov | .................... | B66D 1/14 |
| | | | | 74/425 |
| 2012/0111657 A1* | 5/2012 | Hamakita | ............ | B62D 5/0409 |
| | | | | 180/444 |
| 2013/0025960 A1* | 1/2013 | Hama | ................. | B62D 5/0409 |
| | | | | 180/444 |
| 2013/0239722 A1* | 9/2013 | Vollner | ................... | B66C 23/84 |
| | | | | 74/416 |
| 2014/0083794 A1* | 3/2014 | Ishii | ..................... | B62D 5/0409 |
| | | | | 180/444 |

FOREIGN PATENT DOCUMENTS

| | | | |
|---|---|---|---|
| CN | 103806895 A | 5/2014 | |
| EP | 1760368 A1 | 3/2007 | |
| JP | 2011207457 A | 10/2011 | |

\* cited by examiner

AUTOMOBILE REDUCER

CROSS-REFERENCE TO RELATED APPLICATION

This application claims priority from and the benefit under 35 U.S.C. § 119(a) of Korean Patent Application No. 10-2015-0004013, filed on Jan. 12, 2015, which is hereby incorporated by reference for all purposes as if fully set forth herein.

BACKGROUND OF THE INVENTION

1. Field of the Invention

The present invention relates to an automobile reducer and, more particularly, to an automobile reducer capable of removing of a clearance in the axial direction and a clearance in the direction of rotation, which are generated from a worm shaft bearing and a worm shaft and from the worm shaft and a motor shaft, in the case of a conventional reducer, thereby removing noise and vibration generated from the bearing and the worm shaft, and capable of minimizing the amount of change in clearance, which depends on the change in rotational torque, thereby accurately assisting the driver's steering wheel manipulation.

2. Description of the Prior Art

FIG. 1 is a sectional view of a conventional automobile reducer.

As illustrated in FIG. 1, the conventional automobile reducer 100 is provided with a worm shaft 154, which has a worm 152 formed on the outer peripheral surface thereof, and worm shaft bearings 157a and 157b are installed on both ends of the worm shaft 154, respectively, so as to support the worm shaft 154. In order to prevent the worm shaft bearing 157b from playing in the axial direction of the worm shaft 154, a plug bolt 110 is fastened between a damping coupler 140 and the worm shaft bearing 157b, and the plug bolt 110 is fixed by a plug nut 120.

The worm shaft 154 is connected to a motor shaft 145 of a motor 146 via the damping coupler 140, and the worm shaft 154 is structured to rotate by means of driving of the motor 146.

A worm wheel 156 is provided on one side of the outer diameter of the worm 152, which is formed on the worm shaft 154, so as to mesh with the worm 152, and the worm wheel 156 is structured to be mounted on a steering shaft 106, which transfers a rotating force to a steering wheel (not illustrated) manipulated by the driver, so that the rotating force from the worm shaft 154, which is caused by driving of the motor 146, is transferred to the steering shaft 106.

A gear housing 106 contains the worm shaft 154, the worm wheel 156, and the like. A motor 146 is provided on one side of the gear housing 160 so as to provide the worm shaft 154 with a driving force. The gear housing 160 and the motor 146 are coupled by a motor cover 130 using a bolt 150.

The worm shaft bearing 157b has a ball coupled between inner and outer races, thereby supporting the rotation of the worm shaft 154, which is connected to the motor shaft 145 of the motor 146.

Among the worm shaft bearings 157a and 157b, which support the worm shaft 154, the worm shaft bearing 157b, which supports a part coupled to the motor shaft 145, is provided as a pivot bearing, for example, so that the worm shaft 154 is supported to be able to play.

However, such a conventional automobile reducer has a problem in that, due to the damping coupler, a clearance in the axial direction and a clearance in the direction of rotation are generated from the worm shaft bearing and the worm shaft and from the worm shaft and the motor shaft, and such clearances not only cause the worm shaft bearing and the worm shaft to generate noise and vibration, but also inconvenience the driver.

Furthermore, the worm shaft and the motor shaft cannot rotate simultaneously, due to the clearance in the direction of rotation between the worm shaft and the motor shaft, failing to accurately assist the driver's steering wheel manipulation, and the clearances between the motor and the damping coupler and between the damping coupler and the worm shaft, during the driver's reversed manipulation, cause the worm shaft to jolt.

SUMMARY OF THE INVENTION

The present invention has been made in view of the above-mentioned background, and an aspect of the present invention is to provide an automobile reducer having a damping member, which supports a motor boss and an inner race of a bearing, so that a rotating force is directly transferred from the motor boss to the inner race of the bearing, thereby reducing clearances in the direction of rotation, which are generated from a worm shaft bearing and a worm shaft and from the worm shaft and a motor shaft, in the case of a conventional reducer, minimizing the amount of change in clearance that depends on a change in rotational torque, and accurately assisting the driver's steering wheel manipulation.

Another aspect of the present invention is to provide an automobile reducer having a damping member provided between a motor boss and a worm shaft, thereby preventing the worm shaft from moving in the axial direction, removing any clearance in the axial direction, preventing noise and vibration from being generated from the bearing and the worm shaft, and avoiding any inconvenience to the driver.

The aspect of the present invention is not limited thereto, and other unmentioned aspects of the present invention may be clearly appreciated by those skilled in the art from the following descriptions.

According to an aspect of the present invention, there is provided an automobile reducer including: a worm shaft bearing including an inner race coupled to an end of a worm shaft, which meshes with a worm wheel, an outer race coupled to an inner surface of a gear housing, and a ball coupled between the inner race and the outer race; a motor boss having a coupling hole formed on one side, a motor shaft of a motor being inserted into the coupling hole, and an insertion hole formed on the other side, the worm shaft being inserted into the insertion hole; and a damping member coupled between a side surface of the inner race and a side surface of the motor boss and elastically supported in an axial direction.

An embodiment of the present invention is advantageous in that a damping member, which supports a motor boss and an inner race of a bearing, is provided so that a rotating force is directly transferred from the motor boss to the inner race of the bearing, thereby reducing clearances in the direction of rotation, which are generated from a worm shaft bearing and a worm shaft and from the worm shaft and a motor shaft, in the case of a conventional reducer, minimizing the amount of change in clearance that depends on a change in rotational torque, and accurately assisting the driver's steering wheel manipulation.

There is another advantage in that a damping member is provided between a motor boss and a worm shaft, thereby preventing the worm shaft from moving in the axial direction, removing any clearance in the axial direction, preventing noise and vibration from being generated from the bearing and the worm shaft, and avoiding any inconvenience to the driver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
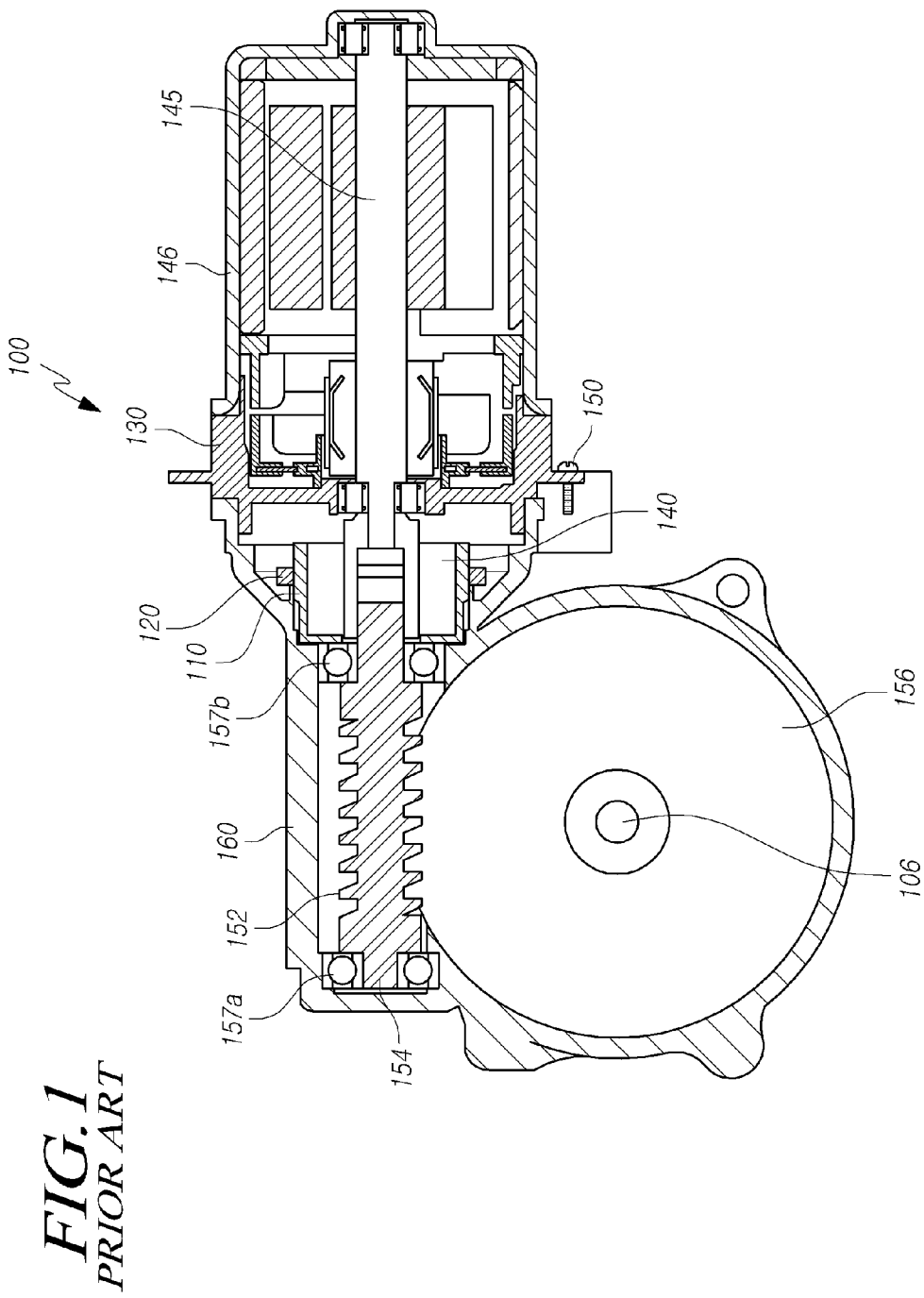
FIG. 1 is a sectional view illustrating a conventional automobile reducer.

Hereinafter, some of the embodiments of the present invention will be described in detail with reference to the exemplary drawings. In adding reference signs to elements in each drawing, the same elements will be designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
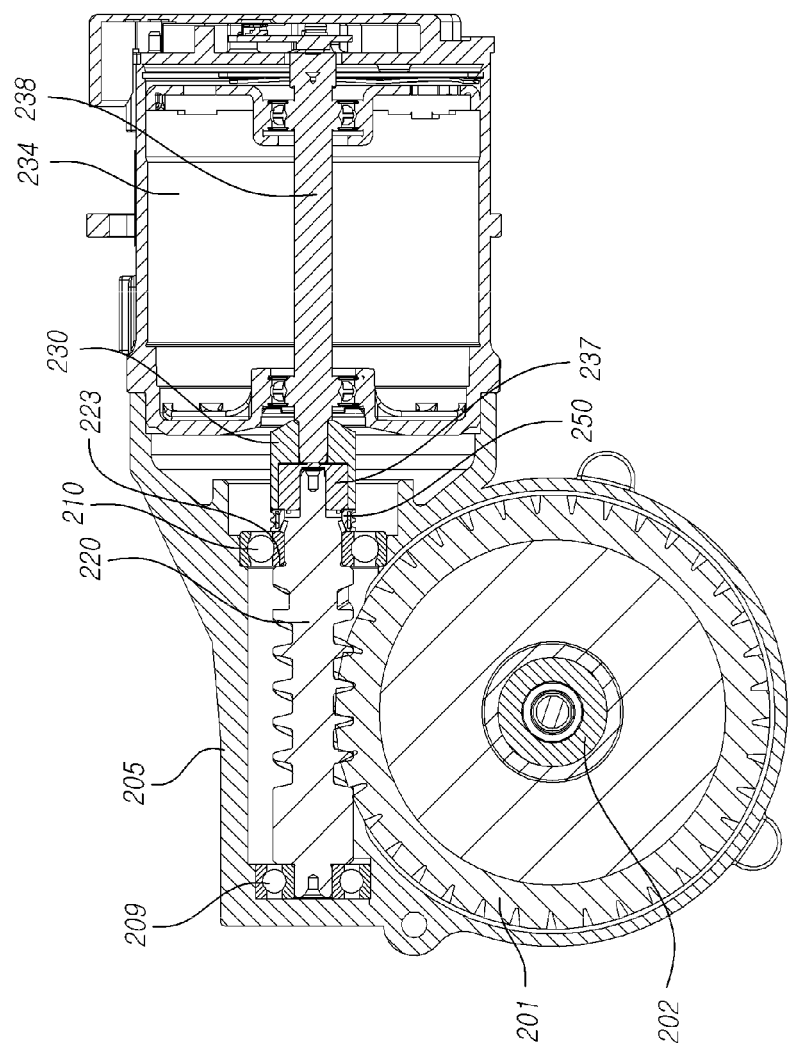
FIG. 2 is a sectional view of an automobile reducer according to an embodiment of the present invention.
Figure 3:
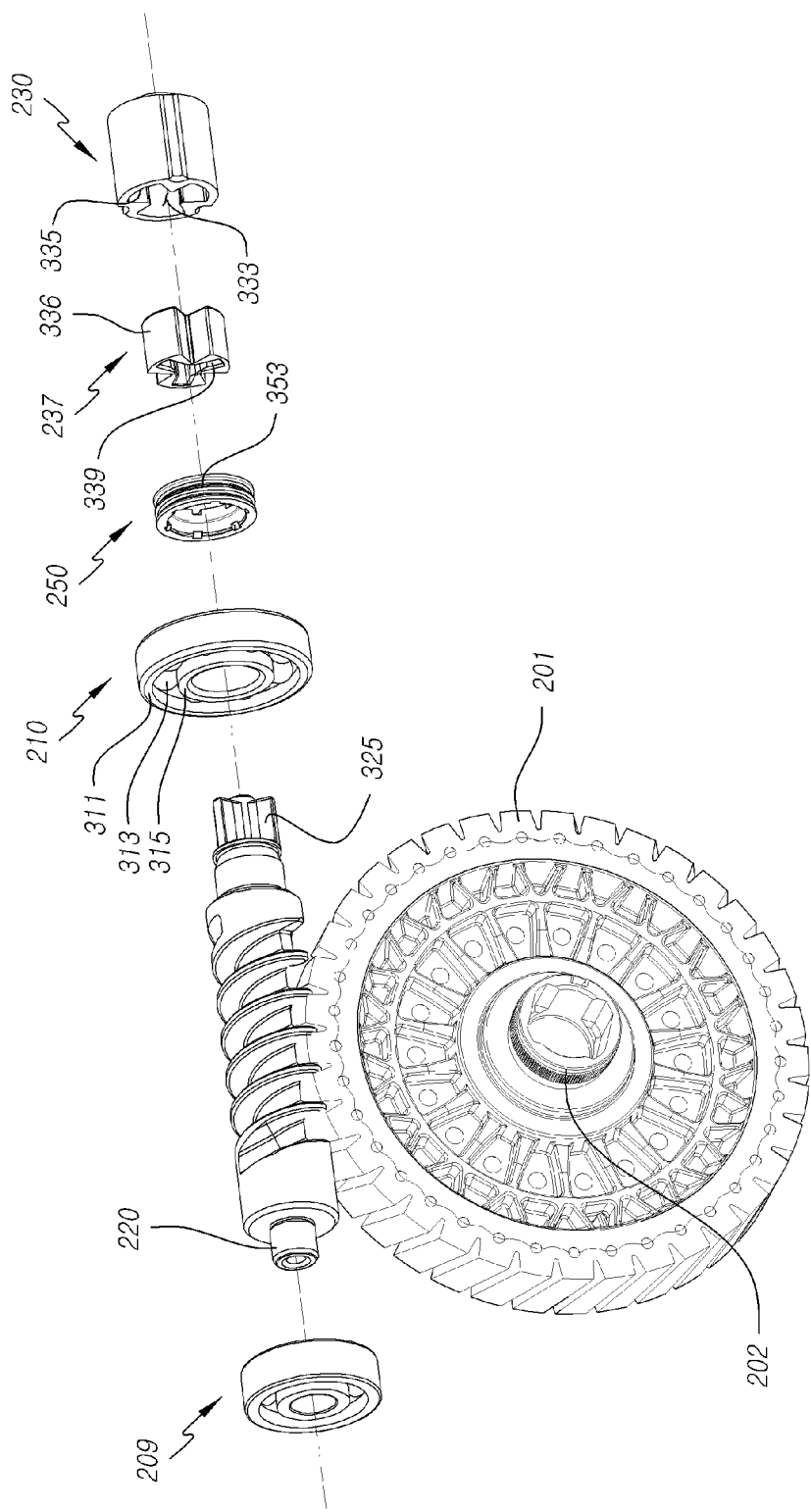
FIG. 3 is a partial exploded perspective view illustrating a part of an automobile reducer according to an embodiment of the present invention.
Figure 4:
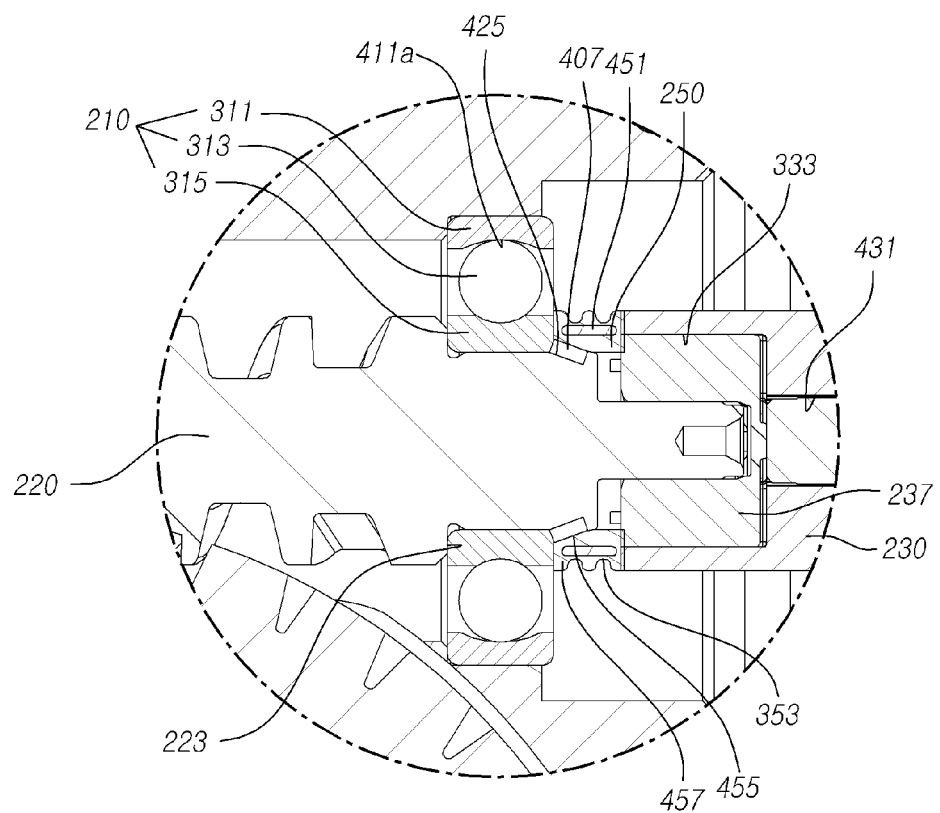
FIG. 4 is a view magnifying a part of FIG. 2.
Figure 5:
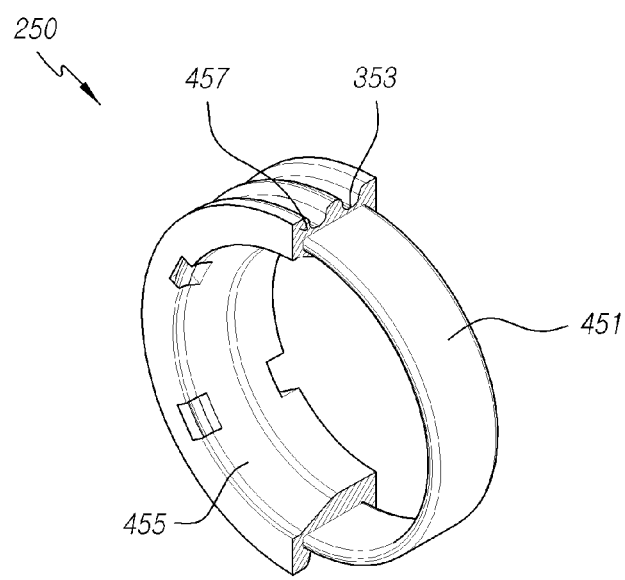
FIG. 5 is a perspective view of a damping member.

FIG. 2 is a sectional view of an automobile reducer according to an embodiment of the present invention; FIG. 3 is a partial exploded perspective view illustrating a part of an automobile reducer according to an embodiment of the present invention; FIG. 4 is a view magnifying a part of FIG. 2; and FIG. 5 is a perspective view of a damping member.

As described in the drawings, an automobile reducer according to an embodiment of the present invention is characterized by including: a worm shaft bearing 210 including an inner race 315 coupled to an end of a worm shaft 220, which meshes with a worm wheel 201, an outer race 311 coupled to the inner peripheral surface of a gear housing 205, and a ball 313 coupled between the inner race 315 and the outer race 311; a motor boss 230 having a coupling hole 431 formed on one side thereof, a motor shaft 238 of a motor 234 being inserted into the coupling hole 431, and an insertion hole 333 formed on the other side thereof, the worm shaft 220 being inserted into the insertion hole 333; and a damping member 250 coupled between a side surface of the inner race 315 and an inner surface of the motor boss 230 and elastically supported in the axial direction.

Such an automobile reducer can be applied not only to a rack-and-double pinion steering device, an electrically-operated power-assisted steering device, or the like, but also to any reducer using a worm and a worm wheel. Therefore, it will be assumed, as an example, in the following description of the present invention that the automobile reducer is provided on an electrically-operated power-assisted steering device.

The worm wheel 201 meshes with the worm shaft 220, and the worm wheel 201 is coupled to a steering shaft 202, which is connected to a steering wheel (not illustrated).

The worm shaft 220 meshes with the worm wheel 201, as described above, and worm shaft bearings 209 and 210 are coupled to both ends of the worm shaft 220, respectively, and are coupled to the inner surface of the gear housing 205.

Among the worm shaft bearings 209 and 210, the worm shaft bearing 210, which is coupled to an end of the worm shaft 220 facing the motor shaft 238, includes an inner race 315, which is coupled to an end of the worm shaft 220, an outer race 311, which is coupled to the inner surface of the gear housing 205, and balls 313, which are coupled between the inner race 315 and the outer race 311. Ball seating grooves 411a are formed on the inner surfaces of the outer race 311 and the inner race 315, respectively, so that the balls 313 are seated.

One side surface of the inner race 315 is supported on a stepped surface 223, which is formed by forming a step on the worm shaft 220, and the other side surface of the inner race 315 is supported by a snap ring 407.

One side of the snap ring 407 is press-fitted into a seating groove 425, which is formed on the outer peripheral surface of the worm shaft 220, and the other side thereof supports the inner race 315 of the worm shaft bearing 210, thereby fixing the inner race 315 of the worm shaft bearing 210.

On the other hand, the worm shaft 220 is connected to a motor shaft 238 via a motor boss 230 so that, when the motor shaft 238 is rotated by driving of the motor 234, the worm shaft 220 interworks and rotates together with the motor shaft 238.

A coupling hole 431 is formed on one side of the motor boss 230, the motor shaft 238 being inserted into the coupling hole 431, and an insertion hole 333 is formed on the other side thereof, the worm shaft 220 being inserted into the insertion hole 333, so that, as the motor shaft 238 rotates, the motor boss 230 and the worm shaft 220 rotate.

Multiple projections 325 are provided on an end of the worm shaft 220, which is inserted into the motor boss 230, so as to protrude radially from the center, and the insertion hole 333, into which the end of the worm shaft 220 is inserted, has recess portions 335, which correspond to the projections 325 of the worm shaft 220, so that, as the motor boss 230 rotates, the worm shaft 220 rotates accordingly.

The inner peripheral surface of the insertion hole 333 is shaped to correspond to the projections 325 so that, as the projections 325 of the worm shaft 220 are coupled to the recess portions 335 of the insertion hole 333 and supported, the rotating force is transferred from the motor boss 230 to the worm shaft 220.

Alternatively, serrations may be formed on the outer peripheral surface of the motor shaft 238, which is inserted into the coupling hole 431, and corresponding serrations may be formed on the inner peripheral surface of the coupling hole 431, although not illustrated in the drawings, so that, as the motor shaft 238 rotates, the motor boss 230 can rotate.

On the other hand, a damping member 250 is coupled between a side surface of the inner race 315 of the worm shaft bearing 210 and a side surface of the motor boss 230 so that the damping member 250 elastically supports the inner race 315 and the motor boss 230 in the axial direction, thereby removing any clearance generated between the motor boss 230 and the inner race 315 and between the motor shaft 238 and the worm shaft 220, which would otherwise generate noise and sense of difference, and avoiding any inconvenience to the driver.

In addition, as illustrated in FIG. 5, the damping member 250 surrounds the outer peripheral surface of the snap ring 407, one side of the damping member 250 supports a side surface of the inner race 315 of the worm shaft bearing 210, and the other side thereof supports a side surface of the motor boss 230. The damping member 250 has a sloping portion 455 formed on the inner peripheral surface so as to slope and expand towards one side, thereby surrounding the outer peripheral surface of the snap ring 407.

As a result of such formation of the sloping portion 455 on the damping member 250, the sloping portion 455 of the damping member 250 surrounds the outer peripheral surface of the snap ring 407, and one side of the damping member 250 supports the inner race 315 of the worm shaft bearing 210, so that the damping member 250 elastically supports between the motor boss 230 and the inner race 315 constantly.

The damping member 250, which is required to have weatherability and flexibility, is made of an elastic material such as NR (Natural Rubber), NBR (Nitrile Butadiene Rubber), CR (Chloroprene Rubber), EPDM (Ethylene Propylene Terpolymer), FPM (Fluoro Elastomer), SBR (Styrene Butadine Rubber), CSM (Chlorosulphonated Polyethylene), silicone, or urethane.

The damping member 250 contains a rigidity reinforcement ring 451 so as to reinforce rigidity, and the rigidity of the rigidity reinforcement ring 451 is set to be larger than that of the damping member 250.

Such provision of the rigidity reinforcement ring 451 guarantees that, when the damping member 250 is coupled between the inner race 315 of the worm shaft bearing 210 and the motor boss 230, elastically supported, and compressed by an impact applied to the damping member 250, the rigidity reinforcement ring 451 limits the amount of compression of the damping member 250 and prevents deformation of the damping member 250.

In addition, the rigidity reinforcement ring 451 connects between the motor boss 230 and the inner race 315 so that power from the motor 235 is directly transferred from the motor boss 230 to the inner race 315 via the damping member 250, thereby compensating for the clearance in the direction of rotation between the motor shaft 238 and the worm shaft 220.

Furthermore, the rigidity reinforcement ring 451 is required to be made of a material having resistance to wear, low-friction property, predetermined degrees of bending and rigidity, and little heat-caused elongation, and therefore is made of an engineering plastic-based material, such as polyacetal (POM), polyamide (PA), polycarbonate (PC), polyimide (PI), or polybutylene terephthalte (PBT), or a metallic material such as steel.

The rigidity reinforcement ring 451, which is made of the above-mentioned material, and which is contained in the damping member 250, increases the damping force of the damping member 250 and effectively buffers an axial impact with regard to the worm shaft 220.

A groove 353 is formed on the outer peripheral surface of the damping member 250 as a recess in the circumferential direction so that, when the worm shaft 220 rotates by a predetermined angle, the groove 353 deforms and buffers the resisting force of the worm shaft 220 with regard to the worm wheel 201.

One or a plurality of such grooves 353 are provided on the outer peripheral surface of the damping member 250, and a protrusion 457 is provided between adjacent grooves 353; accordingly, the grooves 353 and the protrusions 457 alternate with each other on the outer peripheral surface of the damping member 250 so that, when the worm shaft 220 rotates by a predetermined angle, the protrusions 457 are deformed towards the grooves 353.

More specifically, the grooves 353 and the protrusions 457 are configured so that, when an external impact is transferred while the worm shaft 220 and the motor shaft 238 rotate, or when the direction of rotation changes instantly and is followed by a rotation of the worm shaft 220 by a predetermined angle, the grooves 353 are compressed or restored, thereby buffering the resisting force of the worm shaft 220 with regard to the worm wheel 201.

In other words, when an external impact is transferred while the worm shaft 220 and the motor shaft 238 rotate, or when the direction of rotation changes instantly so that the worm shaft 220 and the motor shaft 238 are not positioned coaxially, but come to rotate by a predetermined angle, one side or the other side of the outer peripheral surface of the damping member 250, which is compressed and coupled between the inner race 315 and the motor boss 230, is compressed; the protrusions 457 are then deformed towards the grooves 353, the interval between which decreases, and the grooves 353 expand again and elastically support the inner race 315 and the motor boss 230; as a result, the worm shaft 220 can be restored coaxially together with the motor shaft 238 even if the worm shaft 220 and the inner race 315 are not positioned coaxially.

As such, instantaneous generation of a pivot movement with reference to the part of connection between the worm shaft 220 and the motor shaft 238 is absorbed, and restoration to the coaxial orientation is made, thereby minimizing the amount of change in clearance that depends on the change in rotational torque.

Furthermore, the resisting force of the worm shaft 220 with regard to the worm wheel 201 is buffered, sense of difference transferred to the driver is lessened, and vibration and noise resulting from impacts are reduced. The damping member 250 elastically supports between the inner race 315 of the worn shaft bearing 210 and the motor boss 230 so that the worm shaft 220 can rotate together with the motor shaft 238, thereby facilitating transfer of power from the motor 234.

An elastic member 237 is provided between the insertion hole 333 of the motor boss 230 and the end of the worm shaft 220, which is inserted into the motor boss 230, so that the worm shaft 220 rotates by a predetermined angle, thereby buffering the resisting force of the worm shaft 220 with regard to the worm wheel 201, as described above.

The elastic member 237 has an outer surface shaped to correspond to the recess portions 335, which are formed on the insertion hole 333 of the motor boss 230; the outer surface has multiple elastic protrusions 336 protruding radially from the center, and the inner surface has an insertion groove 339 formed thereon in a shape corresponding to the end of the worm shaft 220 so that the end of the worm shaft 220 is inserted into the insertion groove 339.

The elastic member 237, which is required to have weatherability and flexibility as in the case of the damping member 250, is made of an elastic material, such as NR (Natural Rubber), NBR (Nitrile Butadiene Rubber), CR (Chloroprene Rubber), EPDM (Ethylene Propylene Terpolymer), FPM (Fluoro Elastomer), SBR (Styrene Butadine Rubber), CSM (Chlorosulphonated Polyethylene), silicone, or urethane.

That is, the worm shaft 220 is coupled to the insertion hole 333, and the play of the worm shaft 220 in the diameter direction may be limited; the elastic member 237, which is provided between the insertion hole 333 and the worm shaft 220, enables the worm shaft 220 to easily play in the diameter direction from the insertion hole 333.

In connection with the configuration of the end of the worm shaft 220, which is inserted into the insertion hole 333 of the motor boss 230 so that the worm shaft 220 receives the rotating force of the motor shaft 238, the elastic member 237 elastically supports between the insertion hole 333 of the motor boss 230 and the end of the worm shaft 220, thereby preventing vibration and noise and effectively transferring the rotating force.

The outer race 311 of the worm shaft bearing 210 has a ball seating groove 411a formed as an arc-shaped curved surface so that, when the worm shaft 220 rotates by a predetermined angle, the resisting force of the worm shaft 220 with regard to the worm shaft 201 is buffered.

The ball seating groove 411a, which is formed as an arc-shaped curved surface, provides a tolerance so that the balls 313, the inner race 315, and the worm shaft 220 can move from the outer race 311, which is coupled to the inner surface of the gear housing 205. As a result, when an external impact is transferred while the worm shaft 220 and the motor shaft 238 rotate, or when the direction of rotation changes instantly, the worm shaft 220 rotates by a predetermined angle, and the damping member 250 buffers the resisting force of the worm shaft 220 with regard to the worm wheel 201, thereby lessening sense of difference transferred to the driver and reducing vibration and noise resulting from impacts.

As described above, the present invention is advantageous in that a damping member, which supports a motor boss and an inner race of a bearing, is provided so that a rotating force is directly transferred from the motor boss to the inner race of the bearing, thereby reducing clearances in the axial direction and in the direction of rotation, which are generated from a worm shaft bearing and a worm shaft and from the worm shaft and a motor shaft, in the case of a conventional reducer, minimizing the amount of change in clearance that depends on a change in rotational torque, and accurately assisting the driver's steering wheel manipulation.

There is another advantage in that a damping member is provided between the motor boss and the worm shaft, thereby preventing the worm shaft from moving in the axial direction, removing any clearance in the axial direction, preventing noise and vibration from being generated from the bearing and the worm shaft, and avoiding any inconvenience to the driver.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

BRIEF DESCRIPTION OF REFERENCE NUMERALS

201: worm wheel
202: steering shaft
205: gear housing
209, 210: worm shaft bearings
220: worm shaft
221: worm
230: motor boss
237: elastic member
250: damping member
311: outer race
313: ball
315: inner race
333: insertion hole
335: recess portion
353: groove
411a: ball seating groove
431: coupling hole
451: rigidity reinforcement ring
455: sloping portion
457: protrusion

What is claimed is:

1. An automobile reducer comprising:
 a worm shaft bearing comprising an inner race coupled to an end of a worm shaft, which meshes with a worm wheel, an outer race coupled to an inner surface of a gear housing, and a ball coupled between the inner race and the outer race;
 a motor boss having (i) a coupling hole formed on one side, a motor shaft of a motor being inserted into the coupling hole, (ii) an insertion hole formed on the other side, and (iii) recess portions on an inner peripheral surface of the insertion hole, wherein the recess portions are shaped to correspond to multiple projections of the worm shaft so that the projections of the worm shaft are coupled into the recess portions of the insertion hole; and
 a damping member supported in contact with a side surface of the inner race of the worm shaft bearing and a side surface of the motor boss and elastically supported in an axial direction,
 wherein the end of the worm shaft, which is inserted into the motor boss, has the multiple projections protruding radially from a center,
wherein an elastic member is inserted between the insertion hole and the end of the worm shaft.

2. The automobile reducer of claim 1, wherein the worm shaft bearing has a ball seating groove formed on an inner surface of the outer race as an arc-shaped curved surface.

3. The automobile reducer of claim 1, wherein a rigidity reinforcement member is provided in the damping member and the rigidity reinforcement member have a rigidity larger than the rigidity of the damping member.

4. The automobile reducer of claim 1, wherein a groove is provided on an outer peripheral surface of the damping member as a recess in a circumferential direction.

5. The automobile reducer of claim 1, wherein a snap ring is provided, one side of the snap ring being press-fitted into a seating groove on an outer peripheral surface of the worm shaft, and the other side of the snap ring supporting the inner race of the worm shaft bearing, so as to fix the inner race of the worm shaft bearing.

6. The automobile reducer of claim 5, wherein a sloping portion is formed on an inner peripheral surface of the damping member, wherein the sloping portion slops towards one side of the inner peripheral surface of the damping member in a form of gradually enlarging the inner diameter of the sloping portion from a center of the inner peripheral surface of the damping member towards said one side of the inner peripheral surface of the damping member, and the sloping portion surrounds the outer peripheral surface of the snap ring.

7. The automobile reducer of claim 1, wherein an inner circumferential surface of the inner race and an inner circumferential surface of the outer race are different.

8. The automobile reducer of claim 7, wherein in each radial cross section of the inner race and the outer race, the outer circumferential surface of the inner race has an arc curve having a first radius, the inner circumferential surface of the outer race has an arc curve having a second radius, and wherein the second radius is larger than the first radius.

9. An automobile reducer comprising:
- a worm shaft bearing comprising an inner race coupled to an end of a worm shaft, which meshes with a worm wheel, an outer race coupled to an inner surface of a gear housing, and a ball coupled between the inner race and the outer race;
- a motor boss having (i) a coupling hole formed on one side, a motor shaft of a motor being inserted into the coupling hole, (ii) an insertion hole formed on the other side, and (iii) recess portions on an inner peripheral surface of the insertion hole, wherein the recess portions are shaped to correspond to multiple projections of the worm shaft so that the projections of the worm shaft are coupled into the recess portions of the insertion hole; and
- a damping member supported in contact with a side surface of the inner race of the worm shaft bearing and a side surface of the motor boss and elastically supported in an axial direction, wherein a plurality of recess-shaped grooves are formed on an outer peripheral surface of the damping member in a circumferential direction, and protrusions are formed between respective grooves so that, when the worm shaft rotates by a predetermined angle, the protrusions are deformed towards the grooves.

* * * * *